(12) United States Patent
Yen et al.

(10) Patent No.: US 10,768,765 B2
(45) Date of Patent: Sep. 8, 2020

(54) TOUCH DISPLAY DEVICE

(71) Applicant: Innolux Corporation, Miao-Li County (TW)

(72) Inventors: Chung-Wen Yen, Miao-Li County (TW); Wei-Chih Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/516,436

(22) Filed: Jul. 19, 2019

(65) Prior Publication Data

US 2020/0064972 A1 Feb. 27, 2020

(30) Foreign Application Priority Data

Aug. 23, 2018 (CN) .......................... 2018 1 0966008

(51) Int. Cl.
*G06F 3/044* (2006.01)
(52) U.S. Cl.
CPC .. *G06F 3/0446* (2019.05); *G06F 2203/04107* (2013.01); *G06F 2203/04111* (2013.01)
(58) Field of Classification Search
CPC ......... G06F 3/0446; G06F 2203/04111; G06F 2203/04107
See application file for complete search history.

(56) References Cited

U.S. PATENT DOCUMENTS 10,481,729 B2 * 11/2019 Park ........................ G06F 3/044
2018/0308903 A1 * 10/2018 Jeong .................... H01L 27/323

* cited by examiner

*Primary Examiner* — Vinh T Lam
(74) *Attorney, Agent, or Firm* — McClure, Qualey & Rodack, LLP (57) ABSTRACT

A touch display device includes a display component and a sensing layer disposed above the display component. The display component has a display area having a corner with an arced edge. The arced edge has a radius of curvature. The sensing layer disposed above the display component includes: a plurality of first sensing portions arranged along a first direction and electrically connected to each other, wherein the first sensing portions have an arrangement pitch P in the first direction; and a plurality of second sensing portions disposed adjacent to the first sensing portions, arranged along a second direction and electrically connected to each other, wherein the second direction is different from the first direction. The arrangement pitch P satisfies the following equation: $P > [2\cos(45-\theta/2) - \sqrt{2}]r$, wherein, r represents the radius of curvature, and $\theta$ represents an angle corresponding to the arced edge of the corner and satisfies $0° < \theta \leq 90°$.

19 Claims, 11 Drawing Sheets

TOUCH DISPLAY DEVICE

This application claims the benefit of People's Republic of China application Serial No. 201810966008.1, filed on Aug. 23, 2018, the subject matter of which is incorporated herein by reference.

TECHNICAL FIELD

The disclosure relates in general to a display device, and more particularly to a touch display device.

BACKGROUND

Electronic products with monitor have become an indispensable necessity to modern people in their learning, work and personal entertainment. Examples of electronic products with monitor include smart phones, pads, notebooks, monitors and televisions (TVs). Apart from pursuing after better electrical properties of electronic product, such as higher quality of display effect, faster response to operation, longer lifespan and higher stability, the consumers also expect the functions to be more enriched and diversified. The touch panel is also widely used in electronic products. Through the touch panel, the user can conveniently interact with the electronic product in use. The touch panel can be disposed on the surface of a display device. The user can touch the inquiry message shown on the display device to make a response, touch an option of the menu shown on the display device to make a selection, scroll the selection list, or provide a free-format input. For example, the user can draw an object on the display device or input a text through handwriting.

The touch display device can be divided into resistive type, optical type, capacitive type and electromagnetic type according to the touch drive design of the display screen. The capacitive type touch panel has high reliability, supports multi-touch, dispenses with touch force, and provides an excellent user experience. Therefore, the capacitive type touch panel has been widely used in consumer electronic products such as mobile phones and pads. Currently, the capacitive type touch panel is an important and commonly used drive technology in the field of touch panel.

Accuracy is the most important feature of the touch panel function because the touch panel can identify the touch event at the position identical to actual touch point. The touch display device with better spatial accuracy can correctly identify the input of a touch object (such as finger or stylus). Generally speaking, the touch accuracy of the touch panel with fixed size can be increased as the density of sensing components increases.

The current touch display device has an arced edge design at the bending corner of the display component and the sensing layer to improve integral aesthetics of the display device. However, when the response to the touch event at the corner region adjacent to the arced edge is affected by the arrangement and size of the sensing components, the contact between the touch object and the sensing components and/or the movement of the touch object at the corner region cannot be accurately detected.

SUMMARY

The disclosure is directed to a touch display device with excellent features such as excellent performance in terms of touch accuracy through the design of arrangement pitch of the sensing components and the radius of curvature and relevant angle corresponding to the arced edge of the corner of the sensing layer.

According to one embodiment of the disclosure, a touch display device including a display component and a sensing layer disposed above the display component is provided. The display component has a display area. The display area has a corner with an arced edge. The arced edge has a radius of curvature. The sensing layer disposed above the display component includes: a plurality of first sensing portions arranged along a first direction and electrically connected to each other, wherein the first sensing portions have an arrangement pitch P in the first direction; and a plurality of second sensing portions disposed adjacent to the first sensing portions, arranged along a second direction and electrically connected to each other, wherein the second direction is different from the first direction. The arrangement pitch P satisfies the following equation: $P > [\cos(2\cos(45-\theta/2) - \sqrt{2}]r$, wherein, r represents a radius of curvature, and θ represents an angle corresponding to the arced edge of the corner and satisfies $0° < \theta \le 90°$.

The above and other aspects of the disclosure will become better understood with regards to the following detailed description of the preferred but non-limiting embodiment(s). The following description is made with reference to the accompanying drawings.

DETAILED DESCRIPTION

According to the embodiments of the present disclosure, a touch display device is provided. The pitch of the sensing components is designed to change in response to the particular radius of curvature corresponding to the arced edge of the bending corner of the display component and the sensing layer, such that the touch display device can possess excellent electric properties. For example, the performance of touch accuracy still meets with the requirements of ordinary application products (such as the operating specifications of the products).

A number of embodiments of the present disclosure are disclosed below with reference to accompanying drawings. However, the structure, manufacturing process and content disclosed in the embodiments are for exemplary and explanatory purposes only, and the scope of protection of the present disclosure is not limited to the embodiments. It should be noted that the present disclosure does not illustrate all possible embodiments, and anyone skilled in the technology field of the disclosure will be able to make suitable modifications or changes based on the specification disclosed below to meet actual needs without breaching the spirit of the disclosure. The present disclosure is applicable to other implementations not disclosed in the specification. In addition, the drawings are simplified such that the content of the embodiments can be clearly described, and the shapes, sizes and scales of elements are schematically shown in the drawings for explanatory and exemplary purposes only, not for limiting the scope of protection of the present disclosure.

Moreover, ordinal numbers, such as "the first", "the second", and "the third", are used in the specification and claims to modify the components of the claims. The ordinal numbers of claim components do not imply or represent that the said components have any previous ordinal numbers, nor represent the sequence between a particular claim component and another claim component or the sequence of process in a manufacturing method. The ordinal numbers are used to clearly distinguish the claim components having the same designations. Moreover, when a first material layer is described to be located on or above a second material layer, unless specifically defined, the first material layer and the second material layer may have direct contact. Or, one or more than one other material layer may be interposed between the first material layer and the second material layer. Under such circumstance, the first material layer and the second material layer may not have direct contact.

Figure 1:
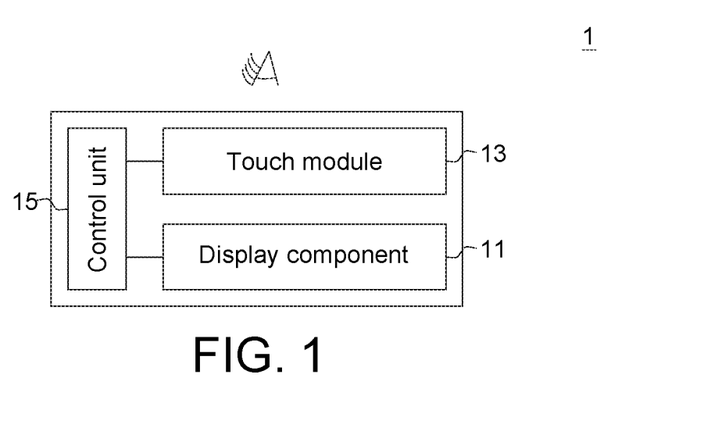
FIG. 1 is a schematic diagram of a touch display device.

FIG. 1 is a schematic diagram of a touch display device. In an embodiment, the touch display device 1 includes a display component 11, a touch module 13 and a control unit 15. The touch module 13 is disposed above the display component 11 and coupled to the control unit 15. As indicated in FIG. 1, the touch module 13 is located above the display component 11 for the user to perform a touch operation. In an example, the touch module 13 includes a sensing layer, which includes a plurality of sensing portions. The control unit 15 (such as an integrated circuit) provides a drive signal for driving the touch module 13 and a video signal for driving the display component 11, and receive a sensing signal from the touch module 13. In the present example, the control unit 15 is an integrated circuit (IC) integrating the touch function and the display function. In another example, the display component 11 and the touch module 13 are respectively coupled to different control units.

Let a projected capacitive touch display device be taken for example. The sensing layer of the projected capacitive touch display device includes a plurality of drive electrodes (Tx) and a plurality of sense electrodes (Rx) respectively arranged on the display component in different directions. The drive electrode (Tx) projects a power line which reaches the sense electrode (Rx) through an insulator (such as air) to form a capacitor. When the finger (carrying a small amount of static electricity) or the stylus tip touches the touch sensing surface, the coupling capacitance between the drive electrode (Tx) and the sense electrode (Rx) will change. Then, the control unit 15 converts the capacitance change into useful coordinate data through data analysis, processing and operation and obtains the touch position according to the coordinate data.

Figure 2A:
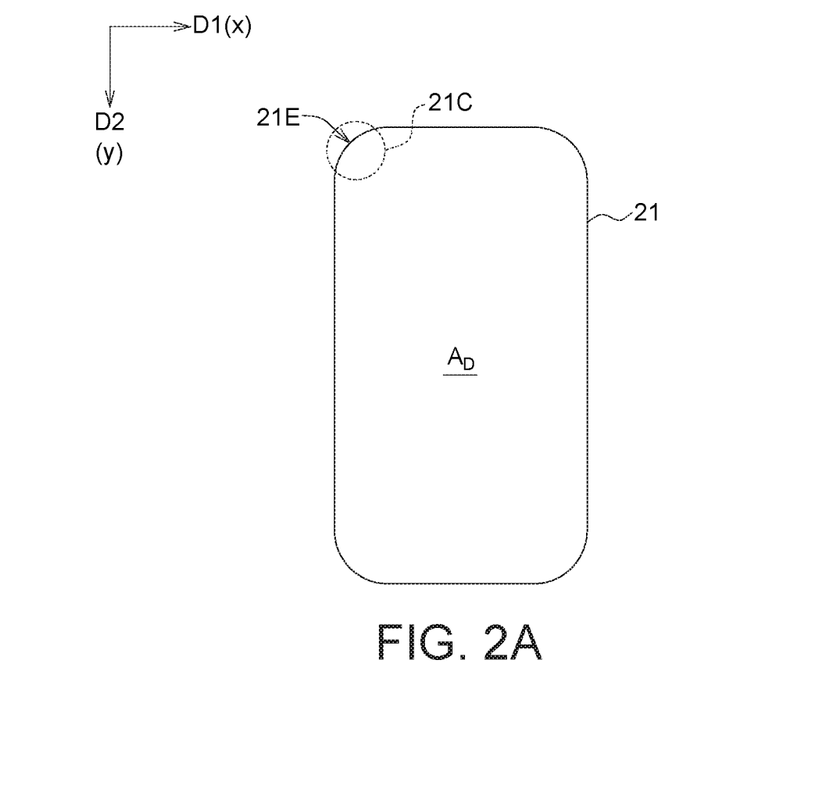
FIGS. 2A and 2B respectively are a schematic diagram of a display area of a display component of a touch display device and a schematic diagram of a sensing layer near a display area corner according to an embodiment of the present disclosure.
Figure 2B:
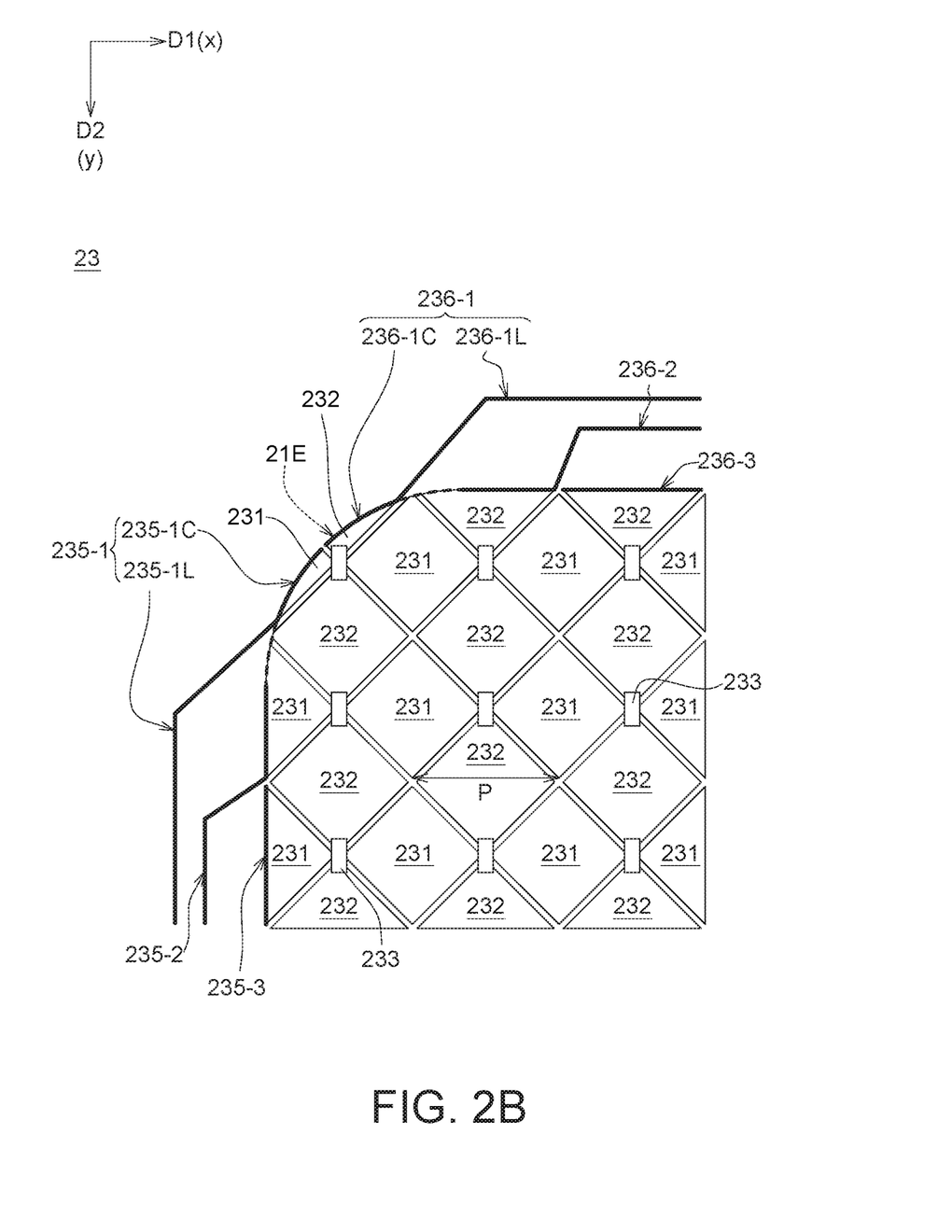

FIGS. 2A and 2B respectively are a schematic diagram of a display area of a display component of a touch display device and a schematic diagram of a sensing layer near a display area corner according to an embodiment of the present disclosure. In an embodiment, the touch display device includes a display component 21 having a display area $A_D$ and a sensing layer 23 disposed above the display component 21, wherein the display area $A_D$ has a corner 21C having an arced edge 21E. The arced edge 21E has a radius of curvature. In an example, the display component can be realized by such as an e-paper, an organic light emitting diode display component (QLED), a light emitting diode display component (LED), a quantum dot light emitting diode display component (QLED) or a liquid crystal display component (LCD), and is not subjected to specific restrictions in the present disclosure. The light emitting diode display component (LED) can be divided into light emitting diode monitor whose light-emitting chip is in a range of 300 μm-10 mm, mini-LED monitor whose light-emitting chip is in a range of 100 μm-300 μm, and micro-LED monitor whose light-emitting chip is in a range of 1 μm-100 μm, wherein the dimension of the light-emitting chip is not subjected to specific restrictions in the present disclosure.

In an embodiment, the sensing layer 23 includes a plurality of first sensing portions (such as Tx drive electrodes) 231 and a plurality of second sensing portions (such as Rx sense electrodes) 232. The first sensing portions 231, arranged along the first direction D1 and electrically connected to each other, have a pitch P in the first direction D1. In an example, a plurality of first sensing portions 231 are periodically arranged in the first direction D1 at at an interval of a pitch P. The second sensing portions 232 are disposed adjacent to the first sensing portions 231, arranged along the second direction D2 and electrically connected to each other. The second direction D2 is different from the first direction. In an example, since each complete first sensing portion 231 and each complete second sensing portion 232 substantially have a square shape, the second sensing portions 232 also have a pitch P in the second direction D2, but the present disclosure is not limited thereto. In an example, a plurality of second sensing portions 232 are periodically arranged in the second direction D2 at an interval of a pitch P. In an example, each of the first sensing portions 231 and each of the second sensing portions 232 have a square shape. That is, the arrangement pitch P of the first sensing portions 231 in the first direction D1 and the arrangement pitch P of the second sensing portions 232 in the second direction D2 are allowed to have a difference by 0-10%. In an example, the first direction D1 and the second direction D2 can be realized by the x direction and the y direction perpendicular to each other. Moreover, the first sensing portions 231 and the second sensing portions 232 can be formed by patterning a transparent conductive material, such as indium tin oxide (ITO) or indium zinc oxide (IZO). Or, the first sensing portions 231 and the second sensing portions 232 can be defined by a grid pattern formed on a metal material. In the present disclosure, the materials of the first sensing is portions 231 and the second sensing portions 232 are not subjected to specific restrictions.

In the present example, the first sensing portions 231 and the second sensing portions 232 are arranged as multi-columns and multi-rows; the first sensing portions 231 arranged in the same row along the first direction D1 are connected to each other; adjacent second sensing portions 232 arranged in the same column along the second direction D2 (illustratively but not restrictively) are connected by bridge electrodes 233. The bridge electrode 233 can cross-connect the first sensing portions 231 and the second sensing portions 232 at a position higher or lower than that of the first sensing portions 231 and the second sensing portions 232, and the said cross-connection is not subjected to specific restrictions in the present disclosure. In an example, the first sensing portions 231 and the second sensing portions 232 are located on the same layer.

In an embodiment, the touch display device further includes wires having a linear segment, a bending segment or a combination thereof. The wires connect the first sensing portions 231, the second sensing portions 232 and the control unit 15, and are used as a transmission path between the control unit 15 and the first sensing portions 231 arranged along the first direction D1 and the second sensing portions 232 arranged along the second direction D2.

As indicated in FIG. 2B, the touch display device further includes a plurality of first wires, such as first wires 235-1, 235-2, and 235-3 . . . , respectively connected to a first sensing portion 231 in each row. The first wire 235-1 has a first bending segment, such as the first bending segment 235-1C, through which the first wire 235-1 is electrically connected to the corresponding first sensing portion 231. Likewise, the touch display device further includes a plurality of second wires, such as the second wires 236-1, 236-2, and 236-3, respectively connected to a second sensing portion 232 in each column. The second wire 236-1 has a second bending segment, such as the second bending segment 236-1C, through which the second wire 236-1 is electrically connected to the corresponding second sensing portion 232.

In an example as indicated in FIG. 2B, the first wire 235-1 further includes a first linear segment 235-1L connected to the first bending segment 235-1C, and a part of the first linear segment 235-1L is extended along the second direction D2. Likewise, the second wire 236-1 further includes a second linear segment 236-1L connected to the second bending segment 236-1C, and a part of the second linear segment 236-1L is extended along the first direction D1.

As indicated in FIG. 2B, the sensing layer 23 includes a plurality of first sensing portions 231, a plurality of second sensing portions 232, a plurality of first wires (such as 235-1, 235-2, 235-3), a plurality of second wires (such as 236-1, 236-2, 236-3) and a plurality of bridge electrodes 233. Even when the corner of the sensing layer 23 has a chamfer, the bridge electrode 233 still exists completely. That is, the sensing layer 23, which originally corresponds to the first of the first sensing portions 231 and the first of the second sensing portions 232 at the display area corner, is trimmed off by part during the chamfering process, but the bridge electrode 233 which connects the first and the second of the second sensing portion 232 in the first column still remains intact (wherein the first of the second sensing portions 232 in the first column refers to the second sensing portion which is trimmed off by part). In an example, the design that the corner of the sensing layer has a chamfer corresponding to the chamfer at the display area corner, therefore the embodiment of the present disclosure is directed to the research and design regarding the arced edge of the display area corner and the arrangement pitch P of the sensing portions.

Figure 3:
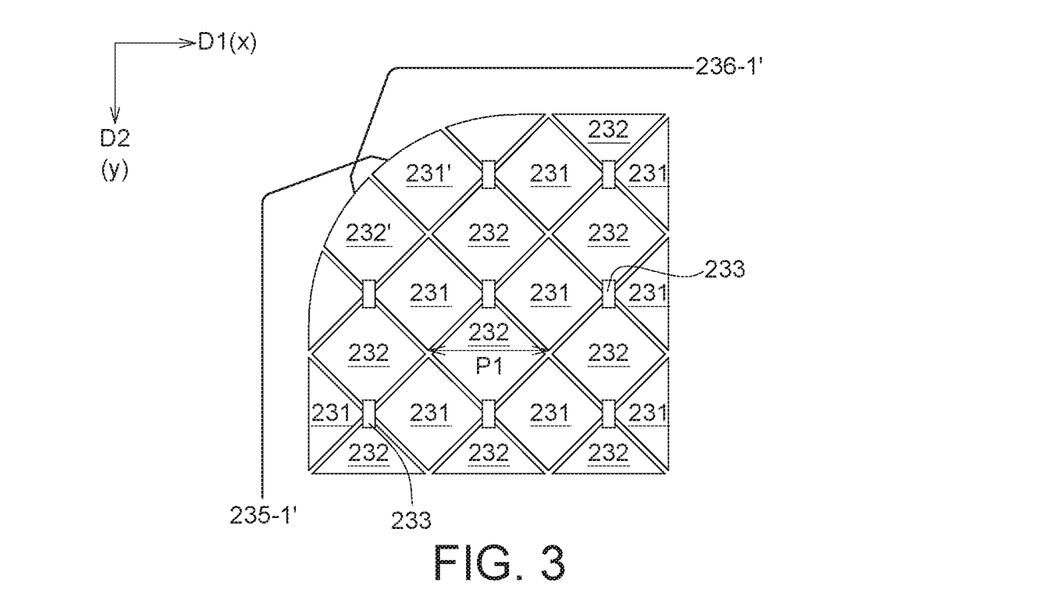
FIG. 3 is an arrangement diagram of sensing portions of a sensing layer near a display area corner according to a research example of the present disclosure.

FIG. 3 is a arrangement diagram of sensing portions of a sensing layer near a display area corner according to a research example of the present disclosure. Given that the radius of curvature remains the same as that of the arced edge 21E of FIG. 2B, if the arrangement pitch P of the first sensing portions 231 continues to reduce in the first direction D1 (for example, the arrangement pitch P of the first sensing portions 231 is reduced to the first arrangement pitch P1 as indicated in FIG. 3), then the bridge electrode 233 connecting the first and the second of the second sensing portions 232 in the first column will be trimmed off. That is, the first of the first sensing portions 231 and the first of the second sensing portions 232 which are originally arranged in FIG. 2B will be completely trimmed off after the chamfering process is completed. Meanwhile, the first wire 235-1' electrically connected to the first sensing portions 231' and the second wire 236-1' electrically connected to the second sensing portions 232' will overlap each other, and the first sensing portions 231' and the second sensing portions 232' corresponding to the display area corner of FIG. 3 will be signal short-circuited.

Therefore, the first arrangement pitch P1 as indicated in FIG. 3 should be a threshold of the arrangement pitch P of the sensing portions. In an embodiment, the arrangement pitch P of the sensing portions should be greater than P1 (P>P1).

Figure 4:
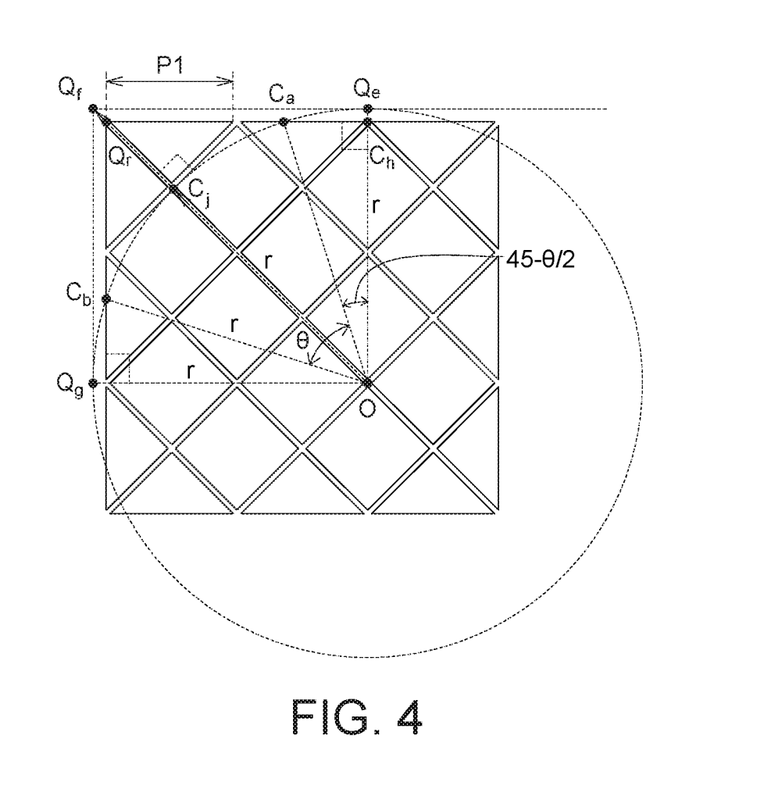
FIG. 4 is a related diagram between a first arrangement pitch P1 and an arced edge of a corner in the arrangement diagram of sensing portions of FIG. 3 according to a research example of the present disclosure.

FIG. 4 is a related diagram between a first arrangement pitch P1 and an arced edge of a corner in the arrangement diagram of sensing portions of FIG. 3 according to a research example of the present disclosure. As indicated in FIG. 4, suppose the arced edge Ca-Cb of the corner is a part of a circle, the arced edge Ca-Cb has a radius of curvature r, and θ represents an angle corresponding to the arced edge Ca-Cb. Then, the distance from the center of circle O to the point Ca or the distance from the center of circle O to the point Cb is exactly the radius r. Let the center of circle O be a point of a square whose side length is equivalent to r, and the square encloses the arced edge Ca-Cb (the 4 points of the square respectively are the center of circle O, the point Qe, the point Qf, and the point Qg). That is, the distance from the center of circle O to the point Qe is quivalent to the radius r of the circle, and is also equivalent to the side length r of the square. Thus, the distance from the center of circle O to the point Qf is equivalent to $\sqrt{2}r$. Here below, the first arrangement pitch P1 is obtained from the equation that the distance from the center of is circle O to the point Qf is equivalent to the sum of relevant segments disclosed above.

Suppose the first sensing portions 231 and the second sensing portion 232 have the same size and each is an equilateral square. Then, an angle of 45−θ/2 is formed by the segment from the center of circle O to the point Ca and the segment from the center of circle O to the point Qe. Thus, the distance from the point Ch to the point Qe is equivalent to:

$$r[1-\cos(45-\theta/2)].$$

The distance from the point Qf to the point Qr is equivalent to:

$$\sqrt{2}r[1-\cos(45-\theta/2)].$$

The distance from point Qr to the point Cj is equivalent to:

$$(\sqrt{2}/2)\ P1.$$

The distance from the center of circle O to the point Cj is exactly the radius r of the circle.

Therefore, the distance from the center of circle O to the point Qf can be expressed as:

$$r+(\sqrt{2}/2)\ P1+\sqrt{2}r[1-\cos(45-\theta/2)]=\sqrt{2}r;$$

Through formula manipulation, the first arrangement pitch P1 can be expressed as:

$$P1=[2\cos(45-\theta/2)-\sqrt{2}]r.$$

The first arrangement pitch P1 as indicated in FIGS. 3 and 4 is a lower limit threshold of the arrangement pitch P of the sensing portions in an embodiment. Therefore, the arrangement pitch P of the sensing portions satisfies the following equation:

$$P>[2\cos(45-\theta/2)-\sqrt{2}]r,$$

wherein, r represents a radius of curvature, and θ represents an angle corresponding to the arced edge of the corner and satisfies 0°<θ≤90°. In an embodiment, the radius of curvature r is in a range of 1 mm-10 mm. In another embodiment, the radius of curvature r is in a range of 4 mm-6 mm, but the range of the radius of curvature r is not subjected to specific restrictions in the present disclosure.

Also, the upper limit threshold the arrangement pitch P of the sensing portions is not subjected to specific restrictions in the present disclosure, and can be properly selected with reference to the applicability specification of application products. Given that the size of the display area and the radius of curvature corresponding to the arced edge 21E remain the same as in FIG. 2B, when the arrangement pitch P of the sensing portions increases, the sensitivity of the touch display device will decrease. A reference example for determining the upper limit threshold of the arrangement pitch P is disclosed below.

Figure 5A:
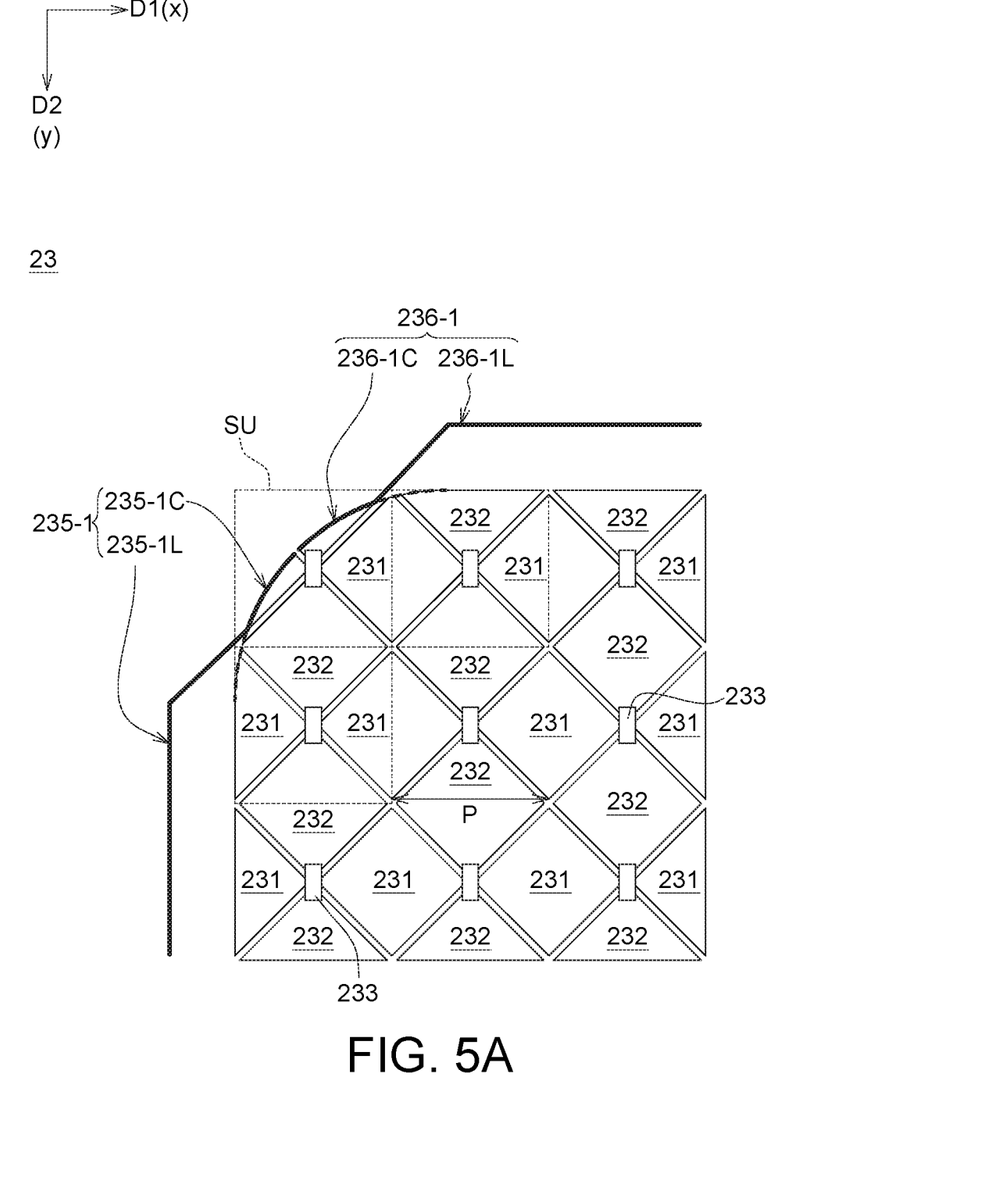
FIG. 5A is a schematic diagram related to a sensing portion arrangement and a sensing unit area of the sensing layer near a display area corner according to an example of the present disclosure.
Figure 5B:
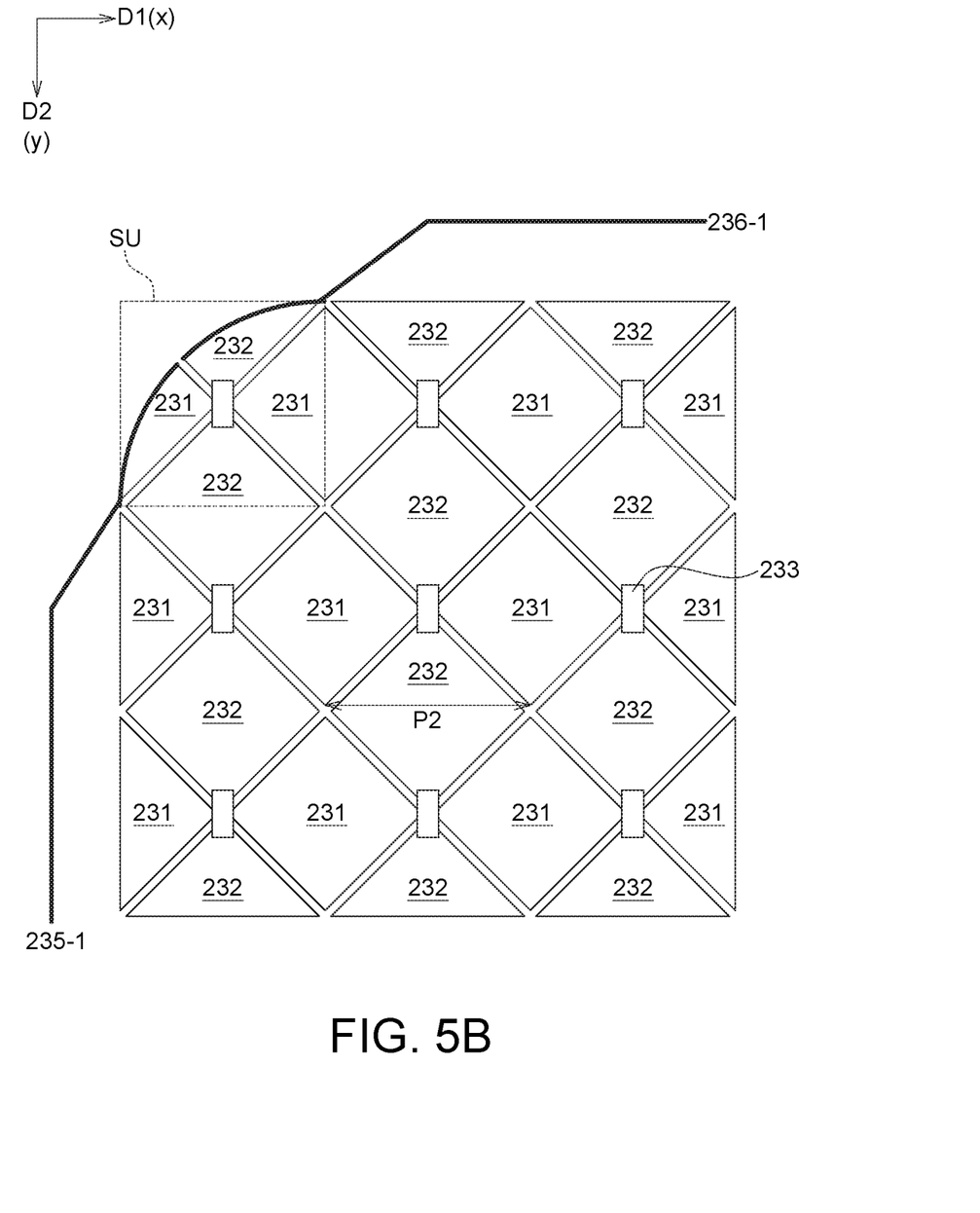
FIG. 5B is a schematic diagram related to another sensing portion arrangement and a sensing unit area of the sensing layer near a display area corner according to another research example of the present disclosure.

FIG. 5A is a schematic diagram related to a sensing portion arrangement and a sensing unit area of the sensing layer near a display area corner according to an example of the present disclosure. FIG. 5B is a schematic diagram related to another sensing portion arrangement and a sensing unit area of the sensing layer near a display area corner according to another research example of the present disclosure. As indicated in FIG. 5A, the architecture of the sensing layer 23 including the first sensing portions 231, the second sensing portions 232, the first wires (such as 235-1), the second wires (such as 236-1), the bridge electrodes 233 and the arced edge 21E of a corner is the same as that in an embodiment as indicated in FIG. 2B. Descriptions, such as the arrangement methods and connection relationships, of relevant elements of FIGS. 5A and 5B can be obtained with reference to above disclosure and are not repeated here.

In an embodiment, the touch display device has a plurality of sensing unit areas SU for detecting whether a touch event is generated and transmitting a corresponding touch information to a control unit, wherein the arced edge 21E of the corner 21C corresponds to more than one sensing unit area SU. When a touch event (including single or multiple touch) occurs at the corner 21C, for example, near the arced edge 21E, the larger the number of sensing unit areas SU (for example, capacitance changes) being affected, the more accurate the touch position obtained by the control unit through data analysis, processing and operation. In an embodiment, the arced edge 21E of the corner 21C of the touch display device of FIG. 5A corresponds to 3 sensing unit areas SU. When determining the upper limit threshold of the arrangement pitch P of the sensing portions, relevant considerations and design can be determined according to the number of sensing unit areas SU to which the arced edge corresponds.

Refer to FIG. 5B. Given that the radius of curvature corresponding to the arced edge 21E remains the same as that of the arced edge 21E of FIG. 2B, if the arrangement pitch P of the first sensing portions 231 continues to increase in the first direction D1 (for example, the arrangement pitch P is increased to the second arrangement pitch P2 as indicated in FIG. 5B), the arced edge 21E of the corner 21C only corresponds to single sensing unit area SU despite that the architecture of the sensing layer 23 (including the first sensing portions 231, the second sensing portions 232 and the bridge electrodes 233) is complete and that the first wire 235-1 electrically connected to the first sensing portions 231 and the second wire 236-1 electrically connected to the second sensing portions 232 do not overlap and become short-circuited. Therefore, when a touch event (including single or multiple touch) occurs at a display area corner, for example, near the arced edge, only one sensing unit area SU is affected (for example, capacitance changes). In comparison to the capacitance change that can be detected in 3 sensing unit areas SU of FIG. 5A, the design of the sensing layer as indicated in FIG. 5B (including the arrangement of the sensing portions) will decrease the accuracy for determining the touch position.

Figure 6:
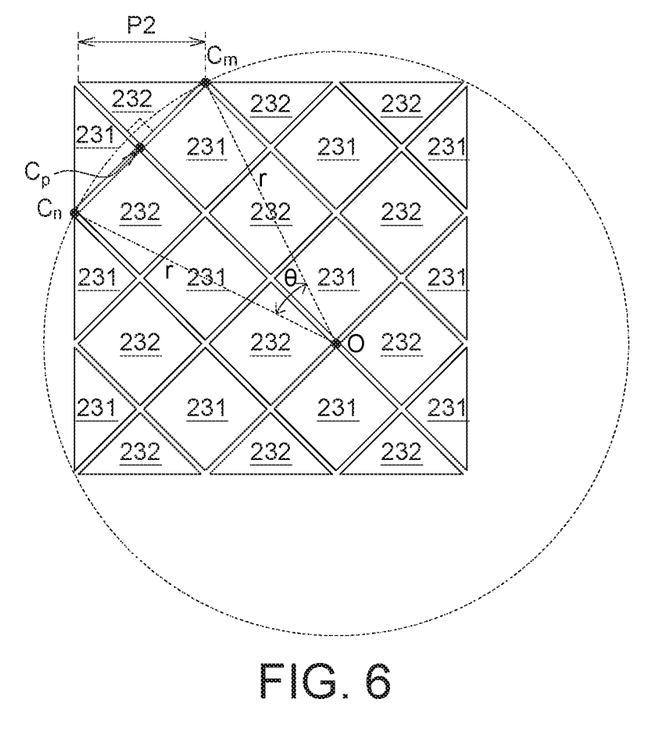
FIG. 6 is a related diagram between a second arrangement pitch P2 and an arced edge of a corner in the arrangement diagram of sensing portions of FIG. 5B according to another research example of the present disclosure.

FIG. 6 is a related diagram between a second arrangement pitch P2 and an arced edge of a corner in the arrangement diagram of sensing portions of FIG. 5B according to another research example of the present disclosure. As indicated in FIG. 6, suppose the arced edge Cm-Cn of the corner is a part of a circle, the arced edge Cm-Cn has a radius of curvature r, and θ represents an angle corresponding to the arced edge Cm-Cn. Then, the distance from the center of circle O to the distance from the point Cm or the center of circle O to the point Cn is exactly the radius r of the circle.

Suppose the first sensing portions 231 and the second sensing portions 232 have the same size and each is an equilateral square. Then, an angle of θ/2 is formed by the segment from the center of circle O to the point Cp and the segment from the center of circle O to the point Cm. Moreover, the center of circle O, the point Cp and the point Cm form a right triangle. Thus, the distance from the point Cp to the point Cm is equivalent to:

$$r\sin(\theta/2).$$

Therefore, the second arrangement pitch P2 can be expresses as:

$$P2=\sqrt{2}r\sin(\theta/2).$$

The second arrangement pitch P2 as indicated in FIG. 5B and FIG. 6 can be used as a reference for determining the upper limit threshold of the arrangement pitch P of the sensing portions. Therefore, in the present reference example, the arrangement pitch P of the sensing portions further satisfies the following equation:

$$P<\sqrt{2}r\sin(\theta/2),$$

wherein, r represents a radius of curvature, and θ represents an angle corresponding to the arced edge of the corner and satisfies 0°<θ≤90°.

To summarize, in an example, the arrangement pitch P of the sensing portions is greater than the first arrangement pitch P1 but smaller than the second arrangement pitch P2 (P1<P<P2), and can be expressed as:

$$[2\cos(45-\theta/2)-\sqrt{2}]r < P < \sqrt{2}r\sin(\theta/2).$$

In practical application, the upper limit threshold of the arrangement pitch P of the sensing portions can be determined with reference to the applicability specification of application products, and is not limited to the upper limit threshold exemplified above. For an application product that allows handwriting input, the tip of the stylus has a smaller diameter (in a range of 0.8 mm-2 mm), and the finger input has a larger touch area (for example, the diameter of the touch area of a single finger is in a range of 4 mm-8 mm). Therefore, the arrangement pitch P of the sensing portion is preferably less than the diameter of the touch area of the touch object for the convenience of recognition. Also, considering multi-touch (such as two-tip touch) and the operation of a display panel, the arrangement pitch P is preferably less than the minimum distance between two tips (such as 7 mm) for the convenience of recognition.

Figure 7:
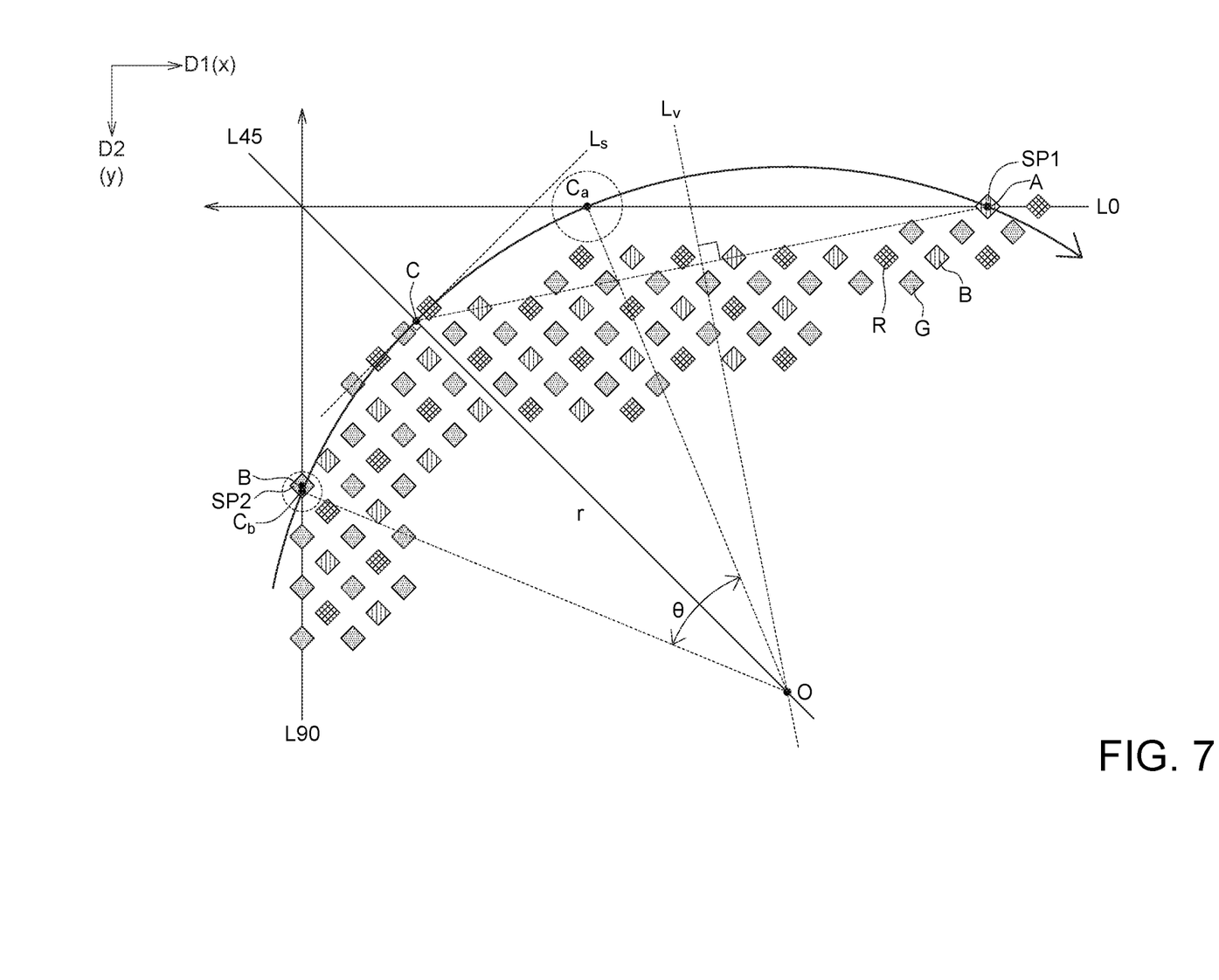
FIG. 7 is a schematic diagram of locating the radius of curvature r and the angle θ corresponding to an arced edge of a corner of a touch display device according to an embodiment of the present disclosure.

FIG. 7 is a schematic diagram of locating the radius of curvature r and the angle θ corresponding to an arced edge of a corner of a touch display device according to an embodiment of the present disclosure. Since the design with the corner of the sensing layer corresponding to a chamfer at the display area corner also has a chamfer design, the arced edge of the sensing layer corner will correspond to the arced edge of the display area corner. Therefore, in the present example, the display component includes 3 types of sub-pixels, namely, red sub-pixels R, green sub-pixels G and blue sub-pixels B. In an application, suppose the display area corner has an arced edge Ca-Cb. Firstly, positions A and B are located, wherein the sub-pixels SP1 and SP2 respectively corresponding to the positions A and B are the sub-pixels on two edges of the display area closest to the corner. Then, two orthogonal straight lines L0 and L90 are respectively drawn from the positions A and B, wherein the straight line L0 is parallel to the first direction D1 (for example, the x direction), and the straight line L90 is parallel to the second direction D2 (for example, the y direction). A straight line L45 forming an angle of 45° with the straight lines L0 and L90 respectively is drawn from the intersection between the straight lines L0 and L90. An extension line (such as dotted line $L_S$) passing through the sub-pixels is drawn according to a plurality of sub-pixels closest to the corner and arranged in a direction perpendicular to the straight line L45 (such as the 4 sub-pixels closest to the corner as indicated in FIG. 7), and the point C being the intersection between the straight line L45 and the extension line $L_S$ can be obtained accordingly. Then, a vertical line Lv of the segment AC can be drawn. The intersection between the vertical line Lv and the straight line L45 is exactly the center of circle O, and the length of the segment OC or the segment OA is the radius of curvature r of an arc. The intersection between the arc and the straight line L0 is a terminal point Ca of the arced edge, and the intersection between the arc and the straight line L90 is a terminal point Cb of the arced edge. Thus, the radius of curvature r corresponding to the arced edge Ca-Cb and the angle θ corresponding to the arced edge can be obtained, In an example, the display area corner is a fan area surrounded by the arced edge Ca-Cb and 2 radii of curvature r.

Figure 8:
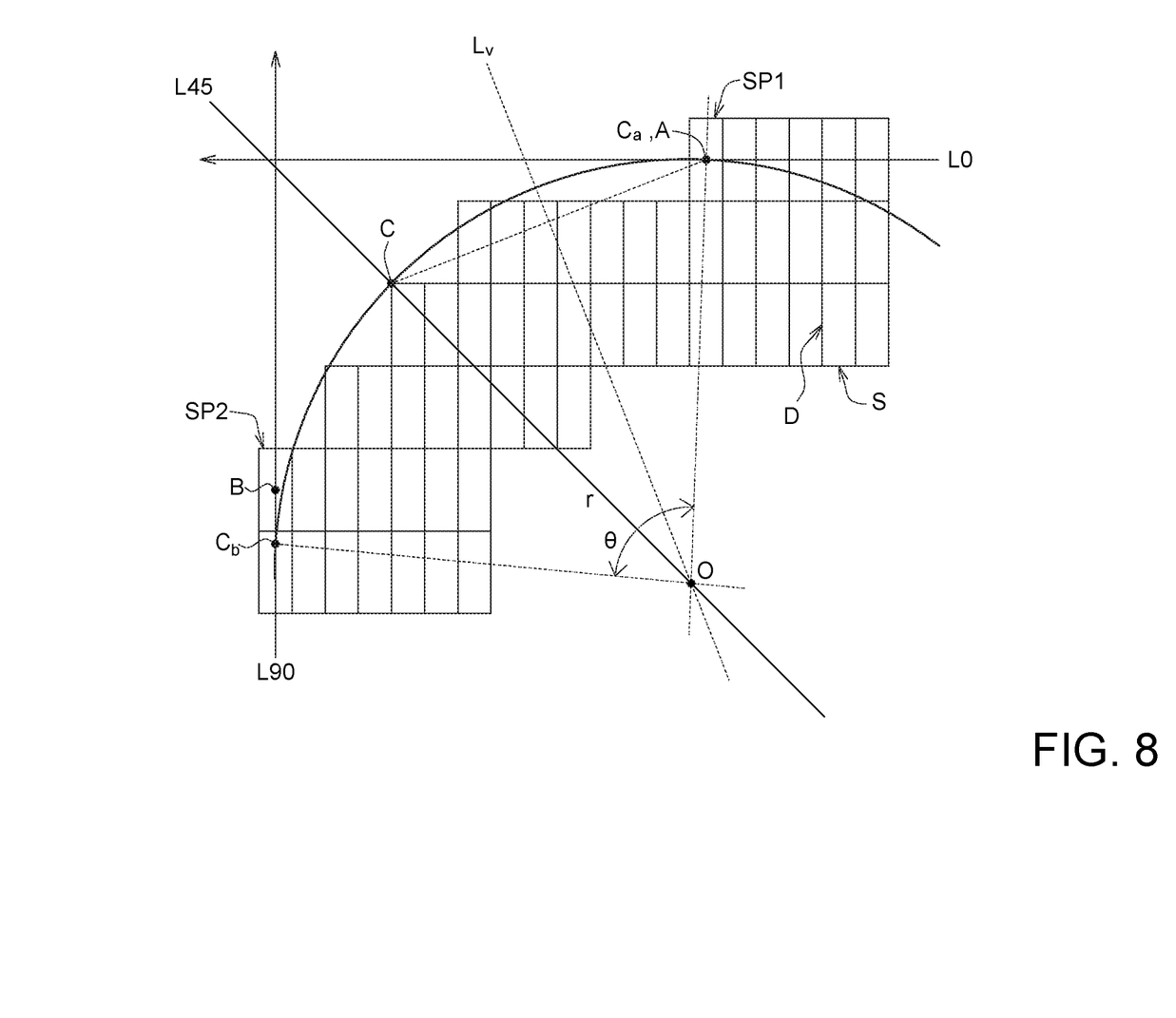
FIG. 8 is a schematic diagram of locating the radius of curvature r and the angle θ corresponding to an arced edge of a corner of a touch display device according to another embodiment of the present disclosure.

FIG. 7 only illustrates one of the implementations of sub-pixel arrangement. The present disclosure can also be used in other implementations of sub-pixel arrangement. In other implementations of sub-pixel arrangement, the radius of curvature r and the angle θ corresponding to the arced edge of the corner can be obtained according to the above method. FIG. 8 illustrates another implementation of sub-pixel arrangement. For the liquid crystal display component, the details of the method for locating the radius of curvature r corresponding to the arced edge of the corner and the angle θ corresponding to the arced edge as indicated in FIG. 8 are similar to that as indicated in FIG. 7 except that the point C is the intersection between the straight line L45 and the sub-pixel region defined by the scan line S and the data line D. Designations common to FIG. 8 and FIG. 7 are used to indicate identical elements, and the similarities are not repeated here.

Figure 9:
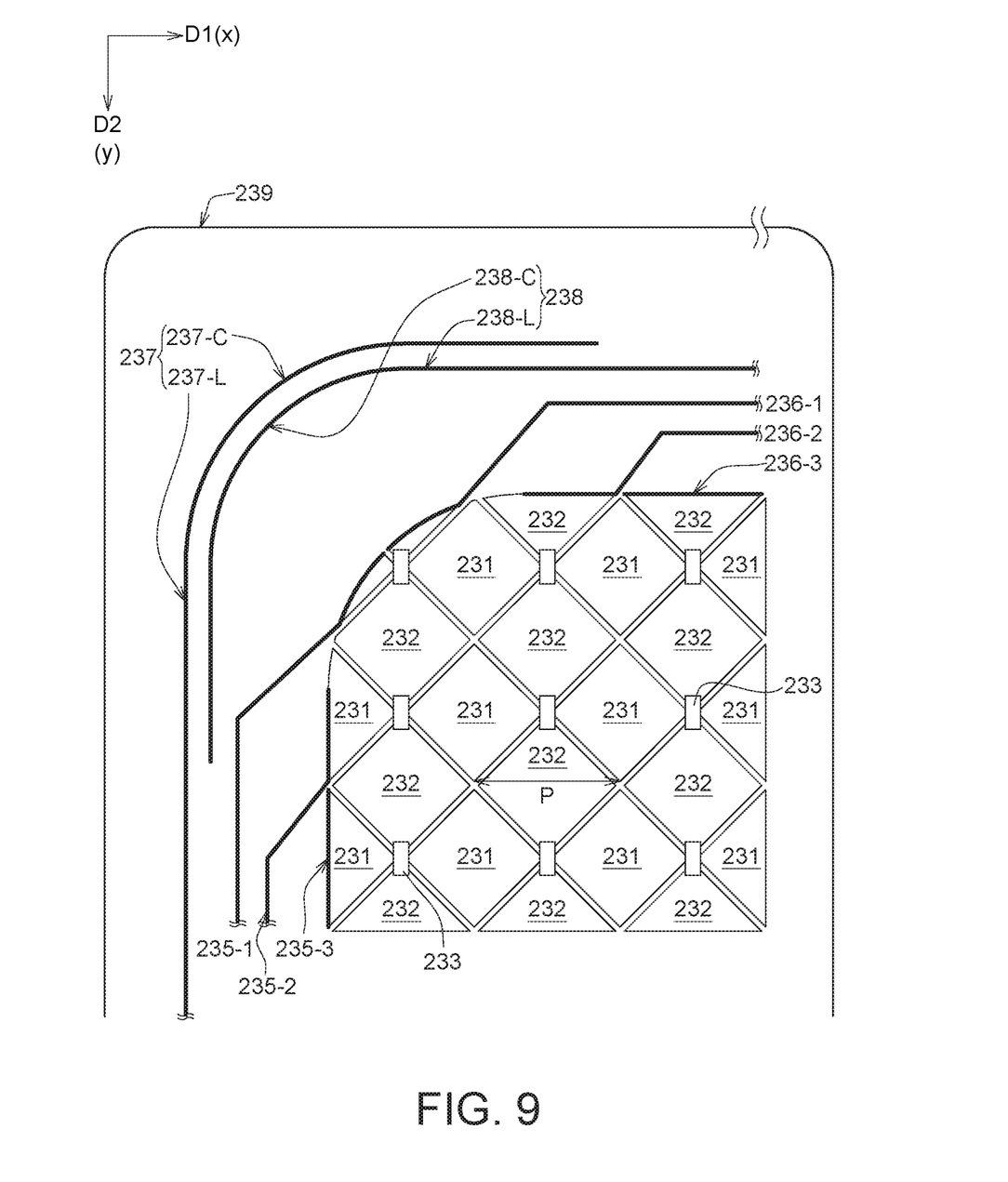
FIG. 9 is a partial diagram of the signal wires and the shielding traces of a touch display device corresponding to a sensing portion according to an embodiment of the present disclosure.

FIG. 9 is a partial diagram of the signal wires and the shielding traces of a touch display device corresponding to a sensing portion according to an embodiment of the present disclosure. Elements common to FIG. 9 and FIG. 2B (such as the first sensing portions 231, the second sensing portions 232, the first wires (such as 235-1, 235-2, and 235-3), the second wires (such as 236-1, 236-2, and 236-3) and the bridge electrode 233) are denoted by the same designations, and respective descriptions can be obtained with reference to above disclosure and are not repeated here. In an embodiment as indicated in FIG. 9, the touch display device further includes a first shielding trace 237 located outside the display area, wherein the first wires (such as 235-1, 235-2, and 235-3 electrically connected to the corresponding first sensing portion 231) are disposed between the sensing layer and the first shielding trace 237. The touch display device further includes a second shielding trace 238 located outside the display area, wherein the second wires (such as 236-1, 236-2, and 236-3 electrically connected to the corresponding second sensing portion 232) are disposed between the sensing layer and the second shielding trace 238.

As indicated in FIG. 9, the first shielding trace 237 includes a first corner shielding segment 237-C and a first linear shielding segment 237-L. connected to the first corner shielding segment 237-C, wherein the first linear shielding segment 237-L is extended along the second direction D2. In the present non-limiting example, the first linear shielding segment 237-L is adjacent to the second sensing portions 232 in the first column and is disposed substantially parallel to the second direction D2 and approximately shields the second sensing portions 232 arranged in the first column. The first corner shielding segment 237-C is extended to one side of the first sensing portions 231 arranged in the first row. In an example, the first corner shielding segment 237-C includes a straight extension segment located on one side of the first sensing portions 231 arranged in the first row.

Likewise, as indicated in FIG. 9, the second shielding trace 238 includes a second corner shielding segment 238-C and a second linear shielding segment 238-L connected to the second corner shielding segment 238-C, wherein the second linear shielding segment 238-L is extended along the first direction D1. In the present non-limiting example, the second linear shielding segment 238-L is adjacent to the first sensing portions 231 arranged in the first row and is disposed substantially parallel the first direction D1 and approximately shields the first sensing portions 231 arranged in the first row. The second corner shielding segment 238-C is extended to one side of the second sensing portions 232 arranged in the first column. In an example, the second corner shielding segment 238-C includes a straight extension segment located on one side of the second sensing portions 232 in the first column.

In an example, the first corner shielding segment 237-C of the first shielding trace 237 and the second corner shielding segment 238-C of the second shielding trace 238 provide double shielding to the corner having a chamfer.

Figure 10:
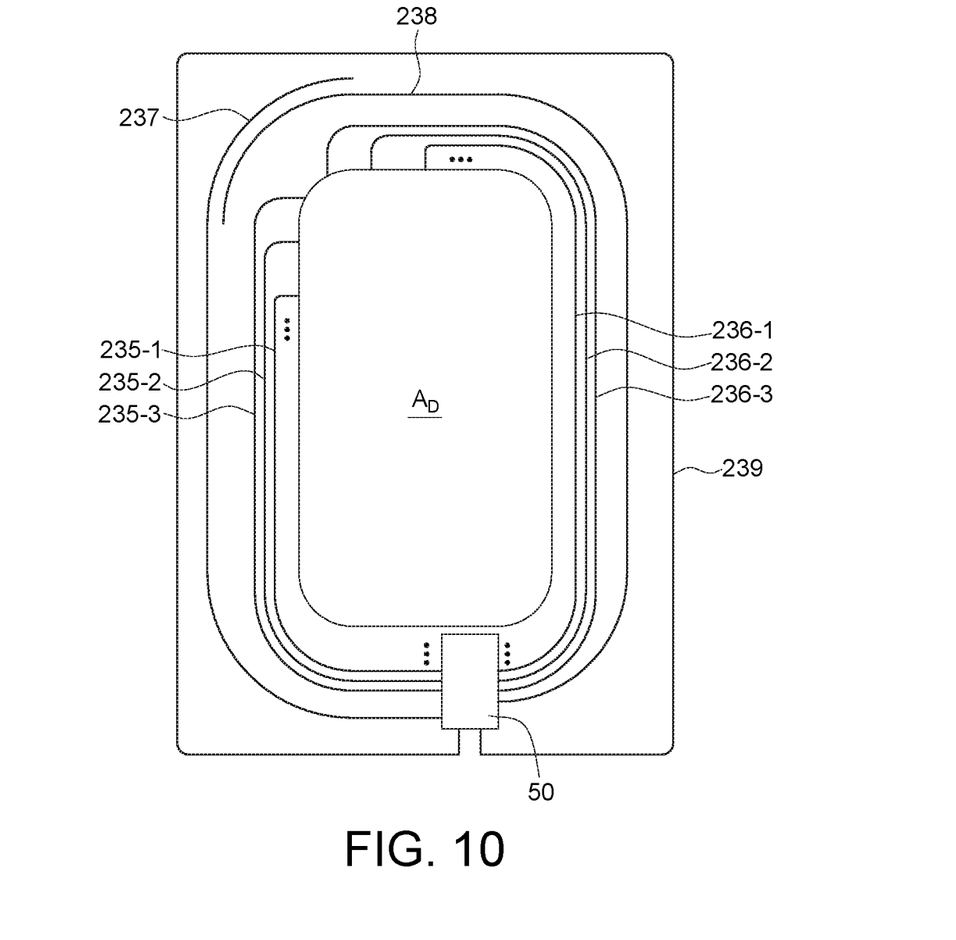
FIG. 10 is a schematic diagram of signal wires, shielding traces and ground wires of a touch display device according to an alternate embodiment of the present disclosure.

In an embodiment as indicated in FIG. 9, the touch display device further includes a ground wire 239 surrounding the outside of the signal wire and the shielding trace to provide an electrostatic protection. FIG. 10 is a schematic diagram of signal wires, shielding traces and ground wires of a touch display device according to an alternate embodiment of the present disclosure. Elements common to FIG. 10, FIGS. 9 and 2B are denoted by the same designations, and respective descriptions can be obtained with reference to above disclosure and are not repeated here. As indicated in FIG. 10, relevant wires (such as the first wires (such as 235-1, 235-2, and 235-3), the second wires (such as 236-1, 236-2, and 236-3), the first shielding trace 237, the second shielding trace 238 and the ground wire 239) are connected to a control unit (such as an IC) 50, but the present disclosure is not limited thereto.

Figure 11:
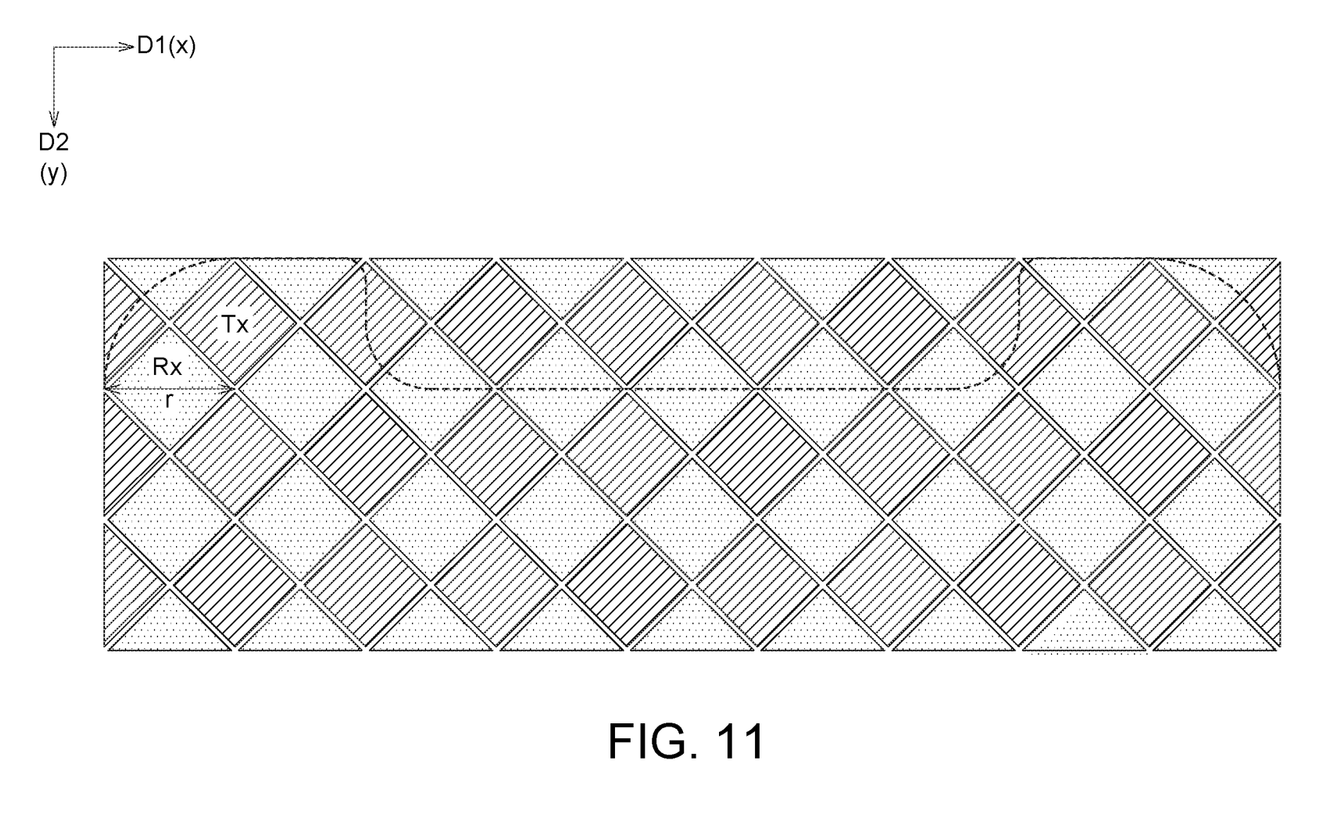
FIG. 11 is a schematic diagram of a touch display device according to an application example of the present disclosure.

Besides, the touch display device using the present disclosure embodiment can be realized by a flat display device, a curved display device or a display device with irregular shape. Moreover, the embodiments of the present disclosure can also be used in a touch display device whose chamfer has a plurality of different radii of curvature, FIG. 11 is a schematic diagram of a touch display device according to an application example of the present disclosure. The radius of curvature r of the above embodiments is defined by the arced edge having the largest radius of curvature among the radii of curvature of a plurality of bending corners.

In other embodiments, suitable modifications or changes can be made according to actual needs and conditions to meet the disposition and arrangement of the components. Although in the above embodiments, the first sensing portions 231 and the second sensing portions 232 are arranged along the x axis and the y axis respectively, the present disclosure is not limited thereto. The first sensing portions and the second sensing portions are not limited to an orthogonal arrangement. When the arrangement direction of the first sensing portions and that of the second sensing portions form a non-right angle, the coordinate information of the touch position still can be obtained by using a suitable algorithm. Therefore, the specification and drawings are for explaining and describing the embodiment only, not for limiting the scope of protection of the present disclosure. Besides, anyone ordinary skilled in relevant technology filed will understand suitable modifications or changes can be made to the shape, position, material and formation of components disclosed in above embodiments without breaching the spirit of the present disclosure.

While the disclosure has been described by way of example and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display device comprising:
    a display component having a display area, wherein the display area has a corner with an arced edge having a radius of curvature; and
    a sensing layer disposed above the display component, the sensing layer comprising:
        a plurality of first sensing portions arranged along a first direction and electrically connected to each other, wherein the first sensing portions have an arrangement pitch P in the first direction; and
        a plurality of second sensing portions disposed adjacent to the first sensing portions, the second sensing portions arranged along a second direction and electrically connected to each other, wherein the second direction is different from the first direction,
    wherein the arrangement pitch P satisfies the following equation:

$$P > [2\cos(45 - \theta/2) - \sqrt{2}]r,$$

wherein, r represents the radius of curvature, and θ represents an angle corresponding to the arced edge of the corner and satisfies 0°<θ≤90°.

2. The touch display device according to claim 1, wherein the arrangement pitch P further satisfies the following equation:

$$P < \sqrt{2}r \sin(\theta/2).$$

3. The touch display device according to claim 2, having a plurality of sensing unit areas for detecting whether a touch event is generated and transmitting a corresponding touch information to a control unit, wherein the arced edge of the corner corresponds to more than one sensing unit area.

4. The touch display device according to claim 1, having a plurality of sensing unit areas for detecting whether a touch event is generated and transmitting a corresponding touch information to a control unit, wherein the arced edge of the corner corresponds to three sensing unit areas.

5. The touch display device according to claim 1, wherein the second sensing portions are arranged in columns along the second direction, and adjacent second sensing portions in the same column are electrically connected through a bridge electrode.

6. The touch display device according to claim 5, wherein the part of the sensing layer corresponding to the corner comprises the bridge electrode located in the first column for connecting the first and the second of the second sensing portions.

7. The touch display device according to claim 1, further comprising a first wire having a first bending segment, and a second wire having a second bending segment, wherein the first wire is electrically connected to at least one of the first sensing portions through the first bending segment, and the second wire is electrically connected to at least one of the second sensing portions through the second bending segment.

8. The touch display device according to claim 7, wherein the first wire further comprises a first linear segment connected to the first bending segment and extended along the second direction.

9. The touch display device according to claim 8, wherein the second wire further comprises a second linear segment connected to the second bending segment and extended along the first direction.

10. The touch display device according to claim 7, further comprising a first shielding trace located outside the display area, wherein the first wire is disposed between the sensing layer and the first shielding trace.

11. The touch display device according to claim 10, wherein the first shielding trace comprises a first corner shielding segment and a first linear shielding segment connected to the first corner shielding segment and extended along the second direction.

12. The touch display device according to claim 11, wherein the first corner shielding segment is extended to one side of the first sensing portions arranged in the first row.

13. The touch display device according to claim 10, further comprising a second shielding trace located outside the display area, wherein the second wire is disposed between the sensing layer and the second shielding trace.

14. The touch display device according to claim 13, wherein the second shielding trace comprises a second corner shielding segment and a second linear shielding segment connected to the second corner shielding segment and extended along the first direction.

15. The touch display device according to claim 14, wherein the second corner shielding segment is extended to one side of the second sensing portions arranged in the first column.

16. The touch display device according to claim 1, wherein the radius of curvature r is in a range of 1 mm-10 mm.

17. The touch display device according to claim 16, wherein the radius of curvature r is in a range of 4 mm-6 mm.

18. The touch display device according to claim 1, wherein the first direction is perpendicular to the second direction.

19. The touch display device according to claim 1, wherein the first sensing portions and the second sensing portions comprise a metal material or a transparent conductive material.

* * * * *